(12) United States Patent
Tsai et al.

(10) Patent No.: US 9,120,934 B2
(45) Date of Patent: Sep. 1, 2015

(54) ANTISTATIC COATING COMPOSITION, ANTISTATIC FILM COATED WITH THE SAME AND METHOD FOR MANUFACTURING THE ANTISTATIC FILM THEREOF

(71) Applicant: BENQ MATERIALS CORPORATION, Taoyuan County (TW)

(72) Inventors: Cheng-Hsin Tsai, Taoyuan County (TW); Yu-Chen Yeh, Taoyuan County (TW)

(73) Assignee: Benq Materials Corporation, Taoyuan County (TW)

( * ) Notice: Subject to any disclaimer, the term of this patent is extended or adjusted under 35 U.S.C. 154(b) by 412 days.

(21) Appl. No.: 13/722,711

(22) Filed: Dec. 20, 2012

(65) Prior Publication Data
US 2013/0178551 A1 Jul. 11, 2013

(30) Foreign Application Priority Data
Jan. 5, 2012 (TW) .............................. 101100431 A

(51) Int. Cl.
| | |
|---|---|
| *C08F 2/50* | (2006.01) |
| *C08F 2/46* | (2006.01) |
| *C08G 61/04* | (2006.01) |
| *C09D 7/12* | (2006.01) |
| *C09D 4/00* | (2006.01) |
| *C09D 5/00* | (2006.01) |
| *C09D 7/00* | (2006.01) |
| *C09D 4/06* | (2006.01) |
| *C08K 5/1565* | (2006.01) |
| *C08K 5/435* | (2006.01) |
| *C08K 5/549* | (2006.01) |
| *C08L 33/02* | (2006.01) |
| *C08F 222/10* | (2006.01) |

(52) U.S. Cl.
CPC ................ *C09D 7/1233* (2013.01); *C09D 4/00* (2013.01); *C09D 4/06* (2013.01); *C09D 5/00* (2013.01); *C09D 7/001* (2013.01); *C09D 7/125* (2013.01); *C08F 222/1006* (2013.01); *C08F 2222/1053* (2013.01); *C08F 2222/1086* (2013.01); *C08K 5/1565* (2013.01); *C08K 5/435* (2013.01); *C08K 5/549* (2013.01); *C08L 33/02* (2013.01)

(58) Field of Classification Search
CPC ........ C09D 7/1233; C09D 7/125; C09D 5/00; C09D 4/06; C09D 7/001; C09D 4/00; C08K 5/549; C08K 5/435; C08F 222/1086; C08F 2222/1053; C08F 222/1006; C08L 33/02
USPC ........................ 522/33, 6, 71, 189, 184; 520/1
See application file for complete search history.

(56) References Cited

U.S. PATENT DOCUMENTS

| | | | |
|---|---|---|---|
| 2005/0197450 A1* | 9/2005 | Amano et al. ................... | 525/30 |
| 2007/0059479 A1* | 3/2007 | Oguni ........................... | 428/64.1 |

FOREIGN PATENT DOCUMENTS

| | | | |
|---|---|---|---|
| CN | 10-2269838 A | | 12/2011 |
| CN | 1026404455 | * | 2/2012 |
| EP | 1582573 A2 | | 10/2005 |

OTHER PUBLICATIONS

Cai et al, CN 102604455 Machine Translation, Feb. 17, 2012.*
Office Action dated Nov. 14, 2013 in Taiwanese Application No. 10-1100431.

* cited by examiner

*Primary Examiner* — Ling Choi
*Assistant Examiner* — Jessica E Whiteley
(74) *Attorney, Agent, or Firm* — Saliwanchik, Lloyd & Eisenschenk

(57) ABSTRACT

This invention discloses an antistatic coating composition and antistatic film coated with the same. The antistatic coating composition comprises a hard coating solution and an antistatic solution. The hard coating solution comprises from 20 to 35 parts by weight of an acrylic oligomer, from 5 to 10 parts by weight of an acrylic monomer, from 40 to 60 parts by weight of a solvent and from 1 to 5 parts by weight of a photoinitiator. The antistatic solution comprises from 0.5 to 5 parts by weight of polyacrylic acid and from 1 to 20 parts by weight of ionic liquid. The antistatic film formed by coating the antistatic coating composition has a pencil hardness of 2H and an initial surface resistivity in the range of $10^8 \sim 10^{11} \Omega/\square$, and the surface resistivity will maintain in the range of $10^{10} \sim 10^{12} \Omega/\square$ after isopropanol (IPA) washing.

10 Claims, No Drawings

ANTISTATIC COATING COMPOSITION, ANTISTATIC FILM COATED WITH THE SAME AND METHOD FOR MANUFACTURING THE ANTISTATIC FILM THEREOF

CROSS-REFERENCE TO RELATED APPLICATION

This application claims the benefit under 35 U.S.C. §119 of Taiwanese Patent Application No. 101100431, filed Jan. 5, 2012, which is hereby incorporated by reference in its entirety.

BACKGROUND

1. Technical Field

The present invention relates to an antistatic coating composition. More particularly, the present invention relates to an antistatic coating composition comprising an ionic liquid. An antistatic film formed of the composition of the present invention has high pencil hardness and low surface resistivity.

2. Description of Related Art

In recent years, liquid crystal display (LCD) and plasma display have been drawing more attention to the industry and become more popular to customers with the improvement of method for manufacturing semiconductor and optical elements. For inhibiting the surface of a display from scratching by external force or electrostatically adhering air dust, a hard coating with antistatisticity is provided to the surface of the display. The hard coating with antistaticity can also be applied to the articles which need scratch-proofing and antistaticity, such as, sun glasses, camera lenses and car windows in order to avoid dust and debris adhered thereon due to the friction.

Several methods have been proposed to provide antistatic function to an article, especially to a film, including: by adding carbon black, metal powder, conductivity metal oxide, surfactant or ionic liquid into a composition for forming the article; or by disposing an antistatic layer comprising conductive fillers or surfactant on the surface of the article.

The approaches mentioned above have various disadvantages. For example, it is known that the addition of metal or non-metal conductive particles to antistatic coating composition will decrease surface resistivity and thus enhance the conductivity of the film formed by the coating composition. However, the addition of particles into the film-forming composition will affect optical characteristic of the film formed thereof, such as lower the transparency thereof and thus the optical products with the film will be adversely affected. Furthermore, this composition is insusceptible to be cured completely during a curing treatment and thus, the surface hardness of the film formed by the said composition does not reach the required level. Another method is proposed by adding a surfactant or an ionic liquid to a composition for forming an antistatic layer. The duration of antistaticity provided by the layer formed by the composition comprising a surfactant or an ionic liquid is easily to be damaged because the antistaticity of the layer is susceptible to be affected by environmental humidity i.e., for example, the surfactant or the ionic liquid in the antistatic layer is easily to be stripped by being wiped with water or alcohols or by being subject to external friction, or the antistatic layer is hazed to lower the light transmittance. It is also suggested a multi-layer structure by coating to manufacture an antistatic film. However, an antistatic film of multi-layer structure is costly in manufacturing process because of the multi-coating process. Moreover, metal oxides such as indium tin oxide (ITO) which is transparency and conductive by electron transferring meet the requirements mentioned above, but a sputtering system is needed in the manufacturing process, which will increase manufacturing cost and make the manufacturing process more complicated. In additions, the flexibility of a coating of inorganic metal oxides is low and thus, will easily peel from the substrate on which the coating is formed, and result in the conductive thereof. Additionally, the conformity between a coating of metal oxides and an organic substrate is low, it may cause the coating peel and make the transparency to decrease.

There is a need to improve the disadvantages mentioned above. The present invention is to provide an antistatic coating composition and an antistatic film formed therefrom to alleviate the aforesaid disadvantages of the prior art. The antistatic coating composition according to the present invention comprises a hard coating solution and an antistatic solution. An antistatic film formed by curing the antistatic coating composition has high hardness and high transmittance without sacrificing the quality of the optical production, and provide an excellent weather resistance without being affected by environmental impact.

BRIEF SUMMARY

According to an aspect of the present invention, an antistatic coating composition is provided.

In an embodiment of the present invention, the antistatic coating composition comprises a hard coating solution and an antistatic solution. The hard coating solution comprises from 20 to 35 parts by weight of an acrylic oligomer, from 5 to 10 parts by weight of an acrylic monomer, from 40 to 60 parts by weight of a solvent and from 1 to 5 parts by weight of a photoinitiator. The antistatic solution comprises from 0.5 to 5 parts by weight of a polyacrylic acid and from 1 to 20 parts by weight of an ionic liquid.

In a preferred embodiment of the present invention, in the hard coating solution, the acrylic oligomer is preferably present in an amount from 23 to 29 parts by weight, the acrylic monomer is preferably present in an amount from 7 to 10 parts by weight, the solvent is preferably present in an amount from 48 to 58 parts by weight and the photoinitiator is preferably present in an amount from 1 to 3 parts by weight; and in the antistatic solution, the polyacrylic acid is preferably present in an amount from 0.5 to 2.5 parts by weight and the ionic liquid is preferably present in an amount from 1 to 15 parts by weight.

In an embodiment of the present invention, the acrylic oligomer of the hard coating solution can be used in the composition of the present invention, including but not limited to, for example, polyurethane acrylate, epoxy acrylate, polyester acrylate, polyether acrylate and polyacrylated acrylate.

In an embodiment of the present invention, the acrylic monomer of the hard coating solution can be used in the composition of the present invention, including but not limited to, for example, 2-phenoxyethyl acrylate, isobornyl acrylate, tetrahydrofurfuryl acrylate, lauryl acrylate, 1,6-hexanediol diacrylate, dipropylene glycol diacrylate, tripropylene glycol diacrylate, ethoxylated isocyanurate triacrylate, trimethylolpropane triacrylate, pentaerythritol triacrylate and dipentaerythritol hexaacrylate.

In an embodiment of the present invention, the solvent of the hard coating solution can be used in the composition of the present invention, including but not limited to, for example, ethyl acetate, butyl acetate, toluene, acetone, ethanol, isopropanol and a combinations thereof.

In an embodiment of the present invention, the photoinitiator of the present hard coating solution can be the known photoinitiator used in the prior art. The suitable photoinitiator includes but not limited to 1-hydroxycyclohexyl phenyl ketone, 2-hydroxy-2-methyl-propane-1-one, diphenyl (2,4,6-trimethylbenzoyl)phosphine oxide, 2-methyl-1-1[4-(methylthio)phenyl]-2-morpholino-1-propanone, benzophenone and 2-isopropyl thioxanone.

In an embodiment of the present invention, the ionic liquid of the antistatic solution of the present invention can be but not limit to 1-ethyl-3-methylimidazolium, N-alkylpyridinium, tetraalkylammonium, tetraalkylphosphonium, hexafluorophosphate, tetrafluoroborate, trifluoromethylsulfonate, bis[(trifloromethyl)sulfonyl]amide, trifluoroethanoate, ethanoate, halide and the combination thereof.

In another embodiment of the present invention, the antistatic coating composition further comprises an additive selectively, the additive can be but not limit to surface additive, antioxidant, water repellent and a combination thereof.

According to a further aspect of the present invention, a method for manufacturing the antistatic film is provided.

The method for manufacturing the antistatic film of the present invention comprises the following steps: (a) mixing 1 to 20 parts by weight of an ionic liquid and 0.5 to 5 parts by weight of a polyacrylic acid to form an antistatic solution; (b) mixing 20 to 35 parts by weight of an acrylic oligomer, 5 to 10 parts by weight of an acrylic monomer, 40 to 60 parts by weight of a solvent and 1 to 5 parts by weight of a photoinitiator to form a hard coating solution; (c) mixing the antistatic solution and the hard coating solution to form an antistatic coating composition; (d) providing a base film; (e) coating the antistatic coating composition on a base film; and (f) curing the antistatic coating composition to form an antistatic hard coating on the base film.

In an embodiment of the method of the present invention, the method for coating the present antistatic coating composition on a base film can be any coating method known to an artisan skilled in the relevant art. The method of coating the antistatic coating composition includes but not limit to roller coating, gravure coating, rod coating and die coating.

In an embodiment of the method of the present invention, the antistatic coating composition is cured by an UV cured treatment, and the light source of the UV cured treatment can be but not limit to high pressure mercury lamp, $O_3$ free mercury lamp, metal halide lamp or electrodeless lamp.

According to a further another aspect of the present invention, an antistatic film manufactured by the above-mentioned method is provided.

The above and other aspects of the invention will become better understood with regard to the following detailed description of the preferred but non-limiting embodiment(s).

DETAILED DESCRIPTION

Accordingly, an antistatic coating composition and a method for manufacturing antistatic film by using the same are provided. In the following detailed description, for purposes of explanation, numerous specific details are set forth in order to provide a thorough understanding of the disclosed embodiments. It will be apparent, however, that one or more embodiments may be practiced without these specific details.

According to an aspect of the present invention, an antistatic coating composition is provided, and the antistatic coating composition can be used to form an antistatic film having excellent weather resistance, high hardness, high transmittance and low surface resistivity.

In an embodiment of the present invention, the antistatic coating composition comprises a hard coating solution and an antistatic solution. The hard coating solution comprises from 20 to 35 parts by weight of an acrylic oligomer, from 5 to 10 parts by weight of an acrylic monomer, from 40 to 60 parts by weight of a solvent and from 1 to 5 parts by weight of a photoinitiator. The antistatic solution comprises from 0.5 to 5 parts by weight of a polyacrylic acid and from 1 to 20 parts by weight of an ionic liquid.

In a preferred embodiment of the present invention, in the hard coating solution, the acrylic oligomer is preferably present in an amount from 23 to 29 parts by weight, the acrylic monomer is preferably present in an amount from 7 to 10 parts by weight, the solvent is preferably present in an amount from 48 to 58 parts by weight and the photoinitiator is preferably present in an amount from 1 to 3 parts by weight; and in the antistatic solution, the polyacrylic acid is preferably present in an amount from 0.5 to 2.5 parts by weight and the ionic liquid is preferably present in an amount from 1 to 15 parts by weight.

The acrylic oligomer suitably used in conventional composition for the hard coating solution can be used in the composition of the present invention, including but not limited to, for example, polyurethane acrylate, epoxy acrylate, polyester acrylate, polyether acrylate and polyacrylated acrylate.

The acrylic monomer suitably used in conventional composition for hard coating solution can be used in the composition of the present invention, including but not limited to, for example, 2-phenoxyethyl acrylate, isobornyl acrylate, tetrahydrofurfuryl acrylate, lauryl acrylate, 1,6-hexanediol diacrylate, dipropylene glycol diacrylate, tripropylene glycol diacrylate, ethoxylated isocyanurate triacrylate, trimethylolpropane triacrylate, pentaerythritol triacrylate and dipentaerythritol hexaacrylate.

The solvent suitably used in conventional composition for hard coating solution can be used in the composition of the present invention, including but not limited to, for example, ethyl acetate, butyl acetate, toluene, acetone, ethanol, isopropanol and a combinations thereof.

Moreover, the photoinitiator can be the known photoinitiator used in the prior art. The suitable photoinitiator includes but are not limited to 1-hydroxycyclohexyl phenyl ketone, 2-hydroxy-2-methyl-propane-1-one, diphenyl (2,4,6-trimethylbenzoyl)phosphine oxide, 2-methyl-1-1 [4-(methylthio)phenyl]-2-morpholino-1-propanone, benzophenone and 2-isopropyl thioxanone.

The ionic liquid of the antistatic solution can be but not limit to 1-ethyl-3-methylimidazolium, N-alkylpyridinium, tetraalkylammonium, tetraalkylphosphonium, hexafluorophosphate, tetrafluoroborate, trifluoromethylsulfonate, bis[(trifloromethyl)sulfonyl]amide, trifluoroethanoate, ethanoate, halide and the combination thereof. In addition, the antistatic coating composition further comprises an additive selectively, the additive can be but not limit to surface additive, antioxidant, water repellent and a combination thereof.

According to a further aspect of the present invention, a method for manufacturing an antistatic film is provided. The antistatic film manufactured by the method of the present invention has excellent weather resistance, high hardness, high transmittance and low surface resistivity.

In an embodiment of the method of the present invention, the method for manufacturing the antistatic film comprises but not limit to the following steps.

Firstly, an antistatic solution and a hard coating solution are prepared. In an embodiment of the method of the present invention, from 1 to 20 parts by weight of an ionic liquid and from 0.5 to 5 parts by weight of a polyacrylic acid are mixed to form an antistatic solution; from 20 to 35 parts by weight of an acrylic oligomer, from 5 to 10 parts by weight of an acrylic monomer, from 40 to 60 parts by weight of a solvent and from 1 to 5 parts by weight of a photoinitiator are mixed to form a hard coating solution. In a preferred embodiment of the method of the present invention, from 1 to 15 parts by weight of an ionic liquid and from 0.5 to 2.5 parts by weight of a polyacrylic acid are mixed to form an antistatic solution; from 23 to 29 parts by weight of an acrylic oligomer, from 7 to 10 parts by weight of an acrylic monomer, from 48 to 58 parts by weight of a solvent and from 1 to 3 parts by weight of a photoinitiator are mixed to form a hard coating solution.

The ionic liquid can be but not limit to 1-ethyl-3-methylimidazolium, N-alkylpyridinium, tetraalkylammonium, tetraalkylphosphonium, hexafluorophosphate, tetrafluoroborate, trifluoromethylsulfonate, bis[(trifloromethyl)sulfonyl] amide, trifluoroethanoate, ethanoate, halide and a combination thereof. In an embodiment of the method of the present invention, the ionic liquid is 1-ethyl-3-methylimidazolium bis(trifluoromethylsulfonyl)imide. In another embodiment of the method of the present invention, the ionic liquid is a combination of 1-ethyl-3-methylimidazolium bis(trifluoromethylsulfonyl)imide and lithium bis(trifluoromethanesulfonyl)imide.

The acrylic oligomer can be polyurethane acrylate, epoxy acrylate, polyester acrylate, polyether acrylate and polyacrylated acrylic oligomer. In an embodiment of the method of the present invention, the acrylic oligimer is polyurethane acrylate oligomer.

The acrylic monomer suitably used in conventional composition for hard coating solution can be used in the composition of the present invention, such as, for example, 2-phenoxyethyl acrylate, isobornyl acrylate, tetrahydrofurfuryl acrylate, lauryl acrylate, 1,6-hexanediol diacrylate, dipropylene glycol diacrylate, tripropylene glycol diacrylate, ethoxylated isocyanurate triacrylate, trimethylolpropane triacrylate, pentaerythritol triacrylate and dipentaerythritol hexaacrylate. In an embodiment of the method of the present invention, the acrylic monomer is dipentaerythritol hexaacrylate.

The solvent suitably used in conventional composition for hard coating solution can be used in the composition of the present invention, such as, for example, ethyl acetate, butyl acetate, toluene, acetone, ethanol, isopropanol and a combinations thereof. In an embodiment of the method of the present invention, the solvent is a combination of ethyl acetate, isopropanol and butyl acetate.

Moreover, the photoinitiator of the present hard coating solution can be the known photoinitiator used in the prior art. The suitable photoinitiator includes but not limited to 1-hydroxycyclohexyl phenyl ketone, 2-hydroxy-2-methyl-propane-1-one, diphenyl (2,4,6-trimethylbenzoyl)phosphine oxide, 2-methyl-1-1[4-(methylthio)phenyl]-2-morpholino-1-propanone, benzophenone and 2-isopropyl thioxanone. In an embodiment of the method of the present invention, the photoinitiator is 1-hydroxycyclohexyl phenyl ketone.

Then, the prepared antistatic solution and hard coating solution are mixed thorough to form an antistatic coating composition.

Optionally, an additive can be added to the antistatic composition for providing specific function. The additive can be but not limit to a surface additive, an antioxidant, a water repellent and a combination thereof. In an embodiment of the method of the present invention, a surface additive polyether modified dimethyl polysiloxane, such as BYK307 (available from BYK Additives & Instruments, US) is added. In another embodiment of the method of the present invention, a water repellent octamethylcyclotetrasiloxane is added for enhancing the weather resistance.

Then, the antistatic coating composition is coated on a base film which is light transmissible. The base film is a stretched or non-stretched thermo plastic resin. The suitable base film includes but not limit to the film of polyethylene terephthalate (PET), triacetyl cellulose (TAC), polyester, polyurethane, polyimide, polyvinylchloride (PVC), polycarbonate (PC), and poly(methyl methacrylate) (PMMA). In an embodiment of the method of the present invention, the base film is polyethylene terephthalate (PET) film.

Moreover, the method for coating the present antistatic coating composition on a base film can be any coating method known to an artisan skilled in the relevant art. The method of coating the antistatic coating composition includes but not limit to roller coating, gravure coating, rod coating and die coating. In an embodiment of the method of the present invention, the antistatic coating composition is coated on the base film by rod coating.

Finally, the antistatic coating composition is cured by a UV curing treatment to form an antistatic film on the base film.

The light source of the UV curing treatment can be but not limit to high pressure mercury lamp, $O_3$ free mercury lamp, metal halide lamp or electrodeless lamp. In an embodiment of the method of the present invention, the light source of the UV curing treatment is electrodeless lamp.

According to a further another aspect of the present invention, an antistatic film manufactured by the above-mentioned method is provided. The antistatic film has excellent weather resistance, high hardness, high transmittance and low surface resistivity.

The pencil hardness of the antistatic film according to the present invention is more than 2H.

Additionally, the antistatic film has an initial surface resistivity in the range of $10^8 \sim 10^{11} \Omega/\square$, after isopropanol (IPA) washing, the surface resistivity will maintain in the range of $10^{10} \sim 10^{12} \Omega/\square$, and maintain haze-free. The weather resistance is excellent therefrom.

The present invention will be explained in further detail with reference to the examples. However, the present invention is not limited to these examples.

EXAMPLE

Preparation of Antistatic Film
Methods of Preparing Antistatic Film

A hard coating solution and an antistatic solution were prepared in the ratio shown in Table 1, stirred and mixed through to form an antistatic coating composition, optionally, an additive was added. Then the antistatic coating composition was coated on a base film of polyethylene terephthalate (PET), after conducting a drying treatment, an UV curing treatment was conducted to cure the antistatic coating composition by UV curing equipment with a specified illumination, then an antistatic is formed.

TABLE 1

The antistatic coating composition of the present invention

| | | |
|---|---|---|
| Hard coating solution (parts by weight) | Acrylic oligomer | 20-35 |
| | Acrylic monomer | 5-10 |
| | Solvent | 40-60 |
| | Photoinitiator | 1-5 |
| Antistatic solution (parts by weight) | Polyacrylic acid | 0.5-5 |
| | Ionic liquid | 1-20 |
| Additive (parts by weight) | Surface additive | 0-0.5 |
| | Water repellent | 0-2 |

The Preparation Steps of Example 1-Example 10

Firstly, an ethyl acetate, an isopropanol and a butyl acetate were mixed as a ratio of 6:3:1 to form a solvent. A 1-hydroxycyclohexyl phenyl ketone as photoinitiator, a polyurethane acrylate oligomer, a dipentaerythritol hexaacrylate and a polyether modified dimethyl polysiloxane BYK307 (available from BYK, US) are added to the solvent to form a hard coating solution.

An ionic liquid 1-ethyl-3-methylimidazolium bis(trifluoromethylsulfonyl)imide, a ionic liquid lithium bis(trifluoromethanesulfonyl)imide, a polyacrylic acid and an octamethylcyclotetrasiloxane as water repellent were mixed and stirred for 30 minutes by ultrasonic atomizer to form an antistatic solution. Example 1-example 10 are shown in Table 2, respectively. And comparative example 1-comparative example 3 are shown in Table 3, respectively.

Then, the antistatic solution was added to the hard coating solution and stirred for 60 minutes by ultrasonic atomizer to form an antistatic coating composition.

After the antistatic coating composition was prepared, the antistatic coating composition was coated on a polyethylene terephthalate (PET) film with a thickness about 188 μm, and the thickness of the antistatic coating layer is about between 6 μm and 14 μm. Then, the antistatic coating was cured by an electrodeless lamp at an intensity of 380 mJ/cm$^2$ to form an antistatic film.

TABLE 2

The example 1-example 10

| Composition | Example (parts by weight) | | | | | | | | | |
|---|---|---|---|---|---|---|---|---|---|---|
| | 1 | 2 | 3 | 4 | 5 | 6 | 7 | 8 | 9 | 10 |
| Acrylic oligomer | 1.5 | 1.5 | 1.5 | 1.5 | 1.5 | 1.5 | 1.5 | 1.5 | 1.5 | 1.5 |
| Acrylic monomer | 0.5 | 0.5 | 0.5 | 0.5 | 0.5 | 0.5 | 0.5 | 0.5 | 0.5 | 0.5 |
| Solvent | 3 | 3 | 3 | 3 | 3 | 3 | 3 | 3 | 3 | 3 |
| Photoinitiator | 0.1 | 0.1 | 0.1 | 0.1 | 0.1 | 0.1 | 0.1 | 0.1 | 0.1 | 0.1 |
| Polyacrylic acid | 0.1 | 0.2 | 0.025 | 0.05 | 0.1 | 0.1 | 0.15 | 0.1 | 0.1 | 0.1 |
| Li-TFSI | 0.05 | 0.1 | 0 | 0 | 0 | 0 | 0 | 0 | 0 | 0 |
| EMIM-TFSI | 0.01 | 0.1 | 1 | 1 | 0.4 | 1 | 0.2 | 0.3 | 0.3 | 0.3 |
| Surface additive | 0.01 | 0.01 | 0.01 | 0.01 | 0.01 | 0.01 | 0.01 | 0.01 | 0.01 | 0.01 |
| Water repellent | 0 | 0 | 0 | 0 | 0 | 0 | 0 | 0 | 0.02 | 0.1 |

TABLE 3

The comparative example 1-comparative example 3

| Composition | Comparative example (parts by weight) | | |
|---|---|---|---|
| | 1 | 2 | 3 |
| Acrylic oligomer | 1.5 | 1.5 | 1.5 |
| Acrylic monomer | 0.5 | 0.5 | 0.5 |
| Solvent | 3 | 3 | 3 |
| Photoinitiator | 0.1 | 0.1 | 0.1 |
| Polyacrylic acid | 0.5 | 0.4 | 0.7 |
| Li-TFSI | 0 | 0.2 | 0.1 |
| EMIM-TFSI | 1 | 0.2 | 0 |
| Surface additive | 0.01 | 0.01 | 0.01 |
| Water repellent | 0 | 0 | 0 |

Physical Properties Test

Tests of Surface Resistivity and Weather Resistance

The initial surface resistivity was measured by high resistance meters MCP-HT450 (available from MITSUBISHI CHEMICAL, Japan) with a voltage 250V at a temperature of 25° C. and a humidity of 60%.

The antistatic film of each example was left in a room temperature for 3 days, then was placed in an oven with a temperature of 90° C. for 3 hours and was wiped 10 times on the surface with isopropanol, after that, the surface resistivity of the antistatic film was measured.

Tests of Hardness

The endurable highest hardness of the antistatic film was measured by pencil scratch hardness tester No. 553 (available from YSAUDA, Japan) with a fixed speed of 1 m/min at an angle of 45°.

Tests of Transmission

The transmittance of the antistatic film was measured by UV-Visible-NIR spectrophotometer U-4100 (available from HITACHI, Japan).

Visual Inspection

The antistatic film was observed by visual inspection to determine whether hazing occurs. The standards of evaluations are shown as follow:

◯: Haze-free and no cloud point.

Δ: Haze or cloud point.

The result of physical properties test of examples and comparative examples are shown as the following table 4.

TABLE 4

The result of physical properties test

| | Initial surface resistivity (Ω/□) | Surface resistivity after IPA washing (Ω/□) | Pencil Hardness | Transmission (%) | Visual inspection |
|---|---|---|---|---|---|
| Example 1 | $2.45 \times 10^{11}$ | $7.53 \times 10^{11}$ | 2H | 91.92 | ◯ |
| Example 2 | $1.51 \times 10^{11}$ | $6.45 \times 10^{11}$ | 2H | 91.93 | ◯ |
| Example 3 | $1.8 \times 10^{8}$ | $2.5 \times 10^{11}$ | 2H | 91.77 | ◯ |
| Example 4 | $5 \times 10^{8}$ | $2 \times 10^{11}$ | 2H | 91.86 | ◯ |
| Example 5 | $4.53 \times 10^{11}$ | $6.65 \times 10^{12}$ | 2H | 91.46 | ◯ |
| Example 6 | $1.41 \times 10^{11}$ | $1.07 \times 10^{12}$ | 2H | 91.4 | ◯ |
| Example 7 | $9.8 \times 10^{11}$ | $5.61 \times 10^{12}$ | 2H | 91.42 | ◯ |
| Example 8 | $6.56 \times 10^{11}$ | $5.1 \times 10^{12}$ | 2H | 91.19 | ◯ |
| Example 9 | $4.6 \times 10^{11}$ | $2.3 \times 10^{12}$ | 2H | 91.51 | ◯ |
| Example 10 | $3.5 \times 10^{11}$ | $2.0 \times 10^{12}$ | 2H | 91.42 | ◯ |
| Comparative example 1 | $3.7 \times 10^{9}$ | $7 \times 10^{9}$ | 2H | 91.6 | Δ |
| Comparative example 2 | $6.3 \times 10^{10}$ | $3.34 \times 10^{12}$ | 2H | 91.9 | ◯ |
| Comparative example 3 | $3.2 \times 10^{12}$ | $4.93 \times 10^{13}$ | 2H | 91.47 | ◯ |

The antistatic film formed by the antistatic coating composition according to the present invention has better weather resistance than that of the comparative examples according to Table 4. Moreover, the difference of initial surface resistivity of the antistatic films of example 1, example 2, example 6, example 7, example 8, example 9 and example 10 and the surface resistivity after IPA washing thereof is less than ten folds, the surface resistivity of example 2 is even up to 6.45× $10^{11} \Omega/\square$ and the transmission is up to 91.93% after the test of weather resistance and wiped with isopropanol. In addition, for example 1 to example 10, the transmission are all more than 91.93%, at the same time, the pencil hardness of which are more than 2H, the visual inspection are still haze-free and without cloud point after performing the weather resistance test.

According to the present invention, the antistatic film formed by the antistatic coating composition has excellent weather resistance, high hardness, high transmittance, low surface resistivity and good optical characteristics.

While the invention has been described by way of example(s) and in terms of the preferred embodiment(s), it is to be understood that the invention is not limited thereto. On the contrary, it is intended to cover various modifications and similar arrangements and procedures, and the scope of the appended claims therefore should be accorded to the broadest interpretation so as to encompass all such modifications and similar arrangements and procedures.

What is claimed is:

1. An antistatic coating composition comprising:
   a hard coating solution comprising:
      from 20 to 35 parts by weight of an acrylic oligomer;
      from 5 to 10 parts by weight of an acrylic monomer;
      from 40 to 60 parts by weight of a solvent; and
      from 1 to 5 parts by weight of a photoinitiator; and
   an antistatic solution comprising:
      from 0.5 to 5 parts by weight of a polyacrylic acid; and
      from 1 to 20 parts by weight of an ionic liquid.

2. The antistatic coating composition according to claim 1, wherein
   the hard coating solution comprising:
      from 23 to 29 parts by weight of the acrylic oligomer;
      from 7 to 10 parts by weight of the acrylic monomer;
      from 48 to 58 parts by weight of the solvent; and
      from 1 to 3 parts by weight of the photoinitiator; and
   the antistatic solution comprising:
      from 0.5 to 2.5 parts by weight of the polyacrylic acid; and
      from 1 to 15 parts by weight of the ionic liquid.

3. The antistatic coating composition according to claim 1, wherein the acrylic oligomer of the hard coating solution is selected from a group consisting of polyurethane acrylate, epoxy acrylate, polyester acrylate, polyether acrylate and polyacrylated acrylic oligomer.

4. The antistatic coating composition according to claim 1, wherein the acrylic monomer of the hard coating solution is selected from a group consisting of 2-phenoxyethyl acrylate, isobornyl acrylate, tetrahydrofurfuryl acrylate, lauryl acrylate, 1,6-hexanediol diacrylate, dipropylene glycol diacrylate, tripropylene glycol diacrylate, ethoxylated isocyanurate triacrylate, trimethylolpropane triacrylate, pentaerythritol triacrylate and dipentaerythritol hexaacrylate.

5. The antistatic coating composition according to claim 1, wherein the solvent of the hard coating solution is selected from a group consisting of ethyl acetate, butyl acetate, toluene, acetone, ethanol, isopropanol and a combinations thereof.

6. The antistatic coating composition according to claim 1, wherein the photoinitiator of the hard coating solution is selected from a group consisting of 1-hydroxycyclohexyl phenyl ketone, 2-hydroxy-2-methyl-propane-1-one, diphenyl (2,4,6-trimethylbenzoyl)phosphine oxide, 2-methyl-1-1 [4-(methylthio)phenyl]-2-morpholino-1-propanone, benzophenone and 2-isopropyl thioxanone.

7. The antistatic coating composition according to claim 1, wherein the ionic liquid of the antistatic solution is selected from a group consisting of 1-ethyl-3-methylimidazolium, N-alkylpyridinium, tetraalkylammonium, tetraalkylphosphonium, hexafluorophosphate, tetrafluoroborate, trifluoromethylsulfonate, bis[(trifloromethyl)sulfonyl]amide, trifluoroethanoate, ethanoate, halide and the combination thereof.

8. The antistatic coating composition according to claim 1, further comprising an additive selected from a group consisting of surface additive, antioxidant and water repellent.

9. A method of manufacturing an antistatic film, comprising the steps:
   (a) preparing an antistatic solution by mixing from 1 to 20 parts by weight of an ionic liquid and from 0.5 to 5 parts by weight of a polyacrylic acid to form the antistatic solution;
   (b) preparing a hard coating solution by mixing from 20 to 35 parts by weight of an acrylic oligomer, from 5 to 10 parts by weight of an acrylic monomer, from 40 to 60 parts by weight of a solvent and from 1 to 5 parts by weight of a photoinitiator to form the hard coating solution;
   (c) mixing the antistatic solution and the hard coating solution to form an antistatic coating composition;
   (d) coating the antistatic coating composition on a base film;
   (e) curing the antistatic coating composition to form an antistatic film.

10. An antistatic film comprising a base film and the antistatic coating composition according to claim 1 on at least one side of the base film.

* * * * *